(12) United States Patent
Schnitter

(10) Patent No.: US 7,410,609 B2
(45) Date of Patent: Aug. 12, 2008

(54) PROCESS FOR PRODUCING CAPACITORS

(75) Inventor: Christoph Schnitter, Holle-Sottrum (DE)

(73) Assignee: H.C. Starck GmbH (DE)

( * ) Notice: Subject to any disclaimer, the term of this patent is extended or adjusted under 35 U.S.C. 154(b) by 365 days.

(21) Appl. No.: 10/894,256

(22) Filed: Jul. 19, 2004

(65) Prior Publication Data

US 2005/0018384 A1   Jan. 27, 2005

(30) Foreign Application Priority Data

Jul. 22, 2003  (DE) ................ 103 33 155

(51) Int. Cl.
*C22C 32/00* (2006.01)

(52) U.S. Cl. .................. 419/19; 361/528; 361/529; 428/702

(58) Field of Classification Search ............... 428/702; 75/351; 361/508, 528, 529; 148/513
See application file for complete search history.

(56) References Cited

U.S. PATENT DOCUMENTS 4,520,430 A   5/1985  Long et al. ............... 361/433
4,722,756 A * 2/1988  Hard ...................... 148/513
6,322,912 B1 * 11/2001 Fife ....................... 428/702
6,373,685 B1   4/2002  Kimmel et al. ........... 361/508
6,462,934 B2  10/2002  Kimmel et al. ........... 361/508
6,558,447 B1   5/2003  Shekhter et al. ............ 75/252
6,576,099 B2   6/2003  Kimmel et al.
6,934,146 B2   8/2005  Omori et al.
2001/0036056 A1  11/2001 Kimmel et al. ........... 361/508
2002/0114722 A1   8/2002 Kimmel et al. ............ 419/45
2002/0135973 A1   9/2002 Kimmel et al. ........... 361/509

FOREIGN PATENT DOCUMENTS

| DE | 34 26 243 | 1/1986 |
| EP | 1 388 870 | 2/2004 |
| WO | WO-01/71738 | 9/2001 |
| WO | WO-02/093596 | 11/2002 |

* cited by examiner

*Primary Examiner*—Roy King
*Assistant Examiner*—Weiping Zhu
(74) *Attorney, Agent, or Firm*—Connolly Bove Lodge & Hutz LLP

(57) ABSTRACT

The invention relates to a process for producing capacitors based on niobium suboxide, and having an insulator layer of niobium pentoxide. Also described is a powder mixture suitable for production of capacitors. Pressed bodies produced from the powder mixture, and capacitors having specific properties are also disclosed.

10 Claims, No Drawings

US 7,410,609 B2

PROCESS FOR PRODUCING CAPACITORS

CROSS REFERENCE TO RELATED PATENT APPLICATION

The present patent application claims the right of priority under 35 U.S.C. §119 (a)-(d) of German Patent Application No. 103 33 155.7, filed Jul. 22, 2003.

FIELD OF THE INVENTION

The invention relates to a process for producing capacitors based on niobium suboxide with an insulator layer of niobium pentoxide, to a powder mixture suitable for production of capacitors, to pressed bodies produced from the powder mixture and to capacitors having specific properties.

BACKGROUND OF THE INVENTION

In the context of the present invention, the term niobium suboxide is to be understood as meaning compounds of the formula $NbO_z$ where $z<2.2$ and preferably $0.5<z<2.2$.

Solid electrolyte capacitors with a very large active capacitor surface area and therefore a small overall size that is suitable for mobile communications electronics used are predominantly those with a niobium or tantalum pentoxide barrier layer applied to a corresponding conductive support, utilizing the stability of these compounds ("valve metal"), the relatively high dielectric constant and the fact that the insulating pentoxide layer can be produced electrochemically with a very uniform layer thickness. Metallic or conductive lower oxidic (suboxide) precursors of the corresponding pentoxides are used as carriers. The support, which simultaneously forms a capacitor electrode (anode), comprises a highly porous, sponge-like structure which is produced by sintering extremely fine particulate primary structures or secondary structures which are already in sponge-like form. The surface of the support structure is electrolytically oxidized ("formed") to give the pentoxide, with the thickness of the pentoxide layer being determined by the maximum voltage used for the electrolytic oxidation ("forming voltage"). The counterelectrode is produced by impregnating the sponge-like structure with manganese nitrate, which is thermally converted into manganese dioxide, or with a liquid precursor of a polymer electrolyte and polymerization. The electrical contacts to the electrodes are formed on one side by a tantalum or niobium wire sintered in during production of the support structure and the metallic capacitor casing, which is insulated from the wire.

The capacitance C of a capacitor is calculated using the following formula:

$$C=(F \cdot \epsilon)/(d \cdot V_F)$$

where F is the capacitor surface area, $\epsilon$ is the dielectric constant, d is the thickness of the insulator layer per V of forming voltage and $V_F$ is the forming voltage. Since the dielectric constant $\epsilon$ is 27.6 for tantalum pentoxide and 41 for niobium pentoxide, but the growth in layer thickness per volt of forming voltage d is 16.6 and 25 Å/V respectively, both pentoxides have virtually the same quotient $\epsilon/d=1.64$ and 1.69 respectively. Capacitors based on both pentoxides, with the same geometry of the anode structures, therefore have the same capacitance. Differences encountered in details of specific weight-related capacitances are trivial, resulting from the different densities of Nb, $NbO_x$ and Ta. Therefore, anode structures made from Nb and $NbO_x$ have the advantage of saving weight when used, for example, in mobile telephones, which strive for every single gram of weight saved. For cost reasons, $NbO_x$ (Niobium suboxide) is more favourable than Nb, since part of the volume of the anode structure is formed by oxygen.

One drawback of niobium suboxide as support body for capacitor barrier layers is that a sufficient compressive strength of the sintered anode body and a sufficient wire tensile strength are only achieved by sintering the pressed bodies at a relatively high sintering temperature (in the region of 1450° C. compared to 1150° C. in the case of Nb metal). The high sintering temperature leads firstly, as a result of increased surface diffusion, to a decrease in the surface area of the pressed body during transition to the sintered body, and therefore to a lower capacitance, and secondly requires increased levels of energy and increased loading being applied to the materials of the crucibles and sintering furnaces.

The reason is that niobium suboxide, by comparison with niobium metal with metallic ductility, already has considerable covalent bond levels, which produce in relative terms a ceramic brittleness.

Furthermore, the compressive strength of the anode bodies prior to sintering leaves something to be desired, since the porous powder agglomerates do not stably "mesh together" during pressing, but rather have an increased tendency to disintegrate or abrade, with the result that not only is the formation of stable sintered bridges impeded, but also agglomerates in a more finely particulate form, even down to isolated primary particles, are formed, causing an adverse change in the pore structure of the sintered anode body. Furthermore, there is increased wear to the press tools be comparison with metal powders. By no means least, niobium oxide powders also have worse flow properties than metal powders, making it more difficult to meter the powders into the press tools.

According to WO 01/71738 A2, therefore, it is attempted to relieve the magnitude of these drawbacks by on the one hand adding lubricants and binders during pressing of the powders, which are intended to compensate for the drawback of insufficient compressive strength of the pressed bodies, and on the other hand by using more finely particulate agglomerates of primary particles, which are less likely to fracture, but this is to the detriment of the pore structure.

SUMMARY OF THE INVENTION

It is an object of the present invention to avoid the drawbacks in capacitor production which are caused by the brittleness of niobium suboxide.

Accordingly, it is an object of the invention to improve the flow properties of the powders during production of niobium suboxide anodes.

Furthermore, it is an object of the invention to provide a powder for producing capacitor anodes based on niobium suboxides which can be pressed to form pressed bodies with a high compressive strength.

Another object of the invention is to provide a powder for the production of capacitor anodes based on niobium suboxides which can be sintered at a relatively low sintering temperature.

Furthermore, it is an object of the invention to provide anodes for capacitors based on niobium suboxide with an increased compressive strength of the sintered body.

Not least, it is a further object of the invention to reduce the number of steps required to produce capacitors based on niobium suboxide and thereby on the one hand to contribute to reducing costs and on the other hand to reduce the risk of contamination with impurities which have an adverse effect on the capacitor properties, in particular with regard to the residual current.

It has been discovered that these and further objects can be achieved by virtue of powder mixtures of niobium suboxide and niobium metal and/or tantalum metal being used as starting material for the production of the pressed and sintered bodies.

Accordingly, the subject matter of the invention is a process for producing capacitor anodes based on niobium suboxide by pressing suitable starting materials in powder form to form powder preforms and sintering the powder preforms to give porous anode bodies, which is characterized in that the pulverulent starting material used is a powder mixture of niobium suboxide powder and valve metal powder.

DETAILED DESCRIPTION OF THE INVENTION

Niobium and/or tantalum metal powder, preferably niobium metal powder, can be used as valve metal powder.

Both the niobium suboxide powders and the niobium metal powders are used in the form of the agglomerates of primary particles which are customary for capacitor production. The primary particles have the standard minimum linear dimensions of 0.4 to 2 μm. The agglomerates have particle sizes with a Mastersizer $D_{50}$ value (ASTM B 822) of 30 to 200 μm, preferably 120 to 180 μm.

The niobium suboxide powder used is preferably a powder of formula $NbO_x$ where x<2.1, particularly preferably where 0.7<x<2.

The oxygen content of the starting oxide ("x" in the above formula) and the relative quantities of niobium suboxide and niobium metal are selected as a function of the desired procedure and the desired product (capacitor). It is desirable for niobium oxide that is present in the support structure of the capacitor (the anode) to have the composition $NbO_y$ where 0.7<y<1.3, preferably 0.9<y<1.15, particularly preferably 1.0<y<1.05. The anode may consist entirely of $NbO_y$. However, the anode may also have geometric regions which consist of niobium metal or very slightly oxidized niobium metal.

According to a first embodiment of the invention, a niobium suboxide powder of the preferred composition $NbO_y$, with y as defined above, is mixed intensively with a niobium metal powder, and the mixture is then introduced into a press mould around a niobium or tantalum contact wire in a manner known per se, pressed to a green density of 2.3 to 3.7 g/cm³ and then sintered under high vacuum to form anodes.

The pressed bodies have a high sintering activity, on the one hand on account of the presence of niobium metal, which has a higher sintering activity, but on the other hand also on account of oxygen exchange at the contact locations between metal and oxide ("reaction sintering"). According to the invention, therefore, sintering temperatures of from 1150 to 1300° C. are sufficient, i.e. the process according to the invention allows sintering temperatures which are lower by 150 to 250° C. to be used.

Niobium metal powder and niobium suboxide powder can be used in any desired quantitative ratio relative to one another, although the effect of the invention disappears at extreme quantitative ratios. A quantitative ratio of from 0.1 to 2 (by weight) is preferred, with from 0.1 to 0.8 being particularly preferred and 0.2 to 0.4 being even more preferred.

The particle size distribution may (given an approximately equal primary particle size) be selected to be similar. In this case, metal powder and suboxide powder are preferably used in approximately equal quantitative ratios, for example approximately with a ratio in the range from 40:60 to 60:40.

It is preferably for the agglomerate particle size of the metal particles to be smaller than that of the suboxide particles. By way of example, the D50 value (according to Mastersizer, ASTM B 822, wetting agent Daxad 11) of the metal particules may be between 20 and 40 μm, whereas the D50 value of the suboxide particles may be between 130 and 190 μm. In this case, it is preferable for the metal powder to be used in subordinate quantities by comparison with the suboxide powder, preferably with a ratio in the range from 9:91 to 20:80.

According to a second embodiment of the invention, the suboxide and metal powder agglomerate are intensively mixed, if appropriate with milling, preferably together, and are then agglomerated, so that agglomerate powders which include both oxidic and metallic regions are formed. The agglomeration preferably takes place at temperatures between 850 and 1200° C. in an inert, preferably argon, atmosphere, so that there is no oxygen exchange between the oxidic and metallic particles apart from at the direct locations of contact through solid-state diffusion.

Preferred and particularly preferred suboxide powders are selected according to the same rules as in the first embodiment of the invention. A starting suboxide $NbO_x$ where x is slightly above 1 is particularly preferred.

After the milling, preferably together, the powders have a preferred particle size distribution which is characterized by a D50 value of from 20 to 50 μm. The D90 value should preferably be less than 90 μm. After the agglomeration, which may if appropriate be repeated a number of times, the powders should have a preferred particle size distribution which is characterized by a D10 value of from 50 to 90 μm, a D50 value of from 150 to 190 μm and a D90 value of from 250 to 290 μm.

It has been found that in particular if the agglomeration treatment is repeated at least twice, with a milling operation in between, the desired formation of sintering bridges between suboxide and metal powder particles is promoted, since the intermediate milling preferentially breaks up oxide-oxide sintered bridges which have just formed during the preceding agglomeration step.

The relative quantitative ratios of suboxide and metal particles may preferably be selected on the basis of same criteria as in the first embodiment of the invention. It is preferable first of all to produce a mixture of suboxide powder and some of the metal powder, to agglomerate this mixture, then to admit a further part of the metal powder, followed by milling of this mixture then a further agglomeration step.

The powders are then pressed together with a niobium or tantalum wire to form anode bodies and sintered. The sintering may be carried out under high vacuum, producing anode structures which include both oxidic and metallic regions.

According to a third embodiment of the invention, a suboxide powder of composition $NbO_x$ where 1.3<x<2.1, preferably 1.8<x<2.1, particularly preferably 1.9<x<2, is mixed with a quantity of a metal powder which is such that a mean composition of the mixture which corresponds to the formula $NbO_y$ where 0.7<y<1.3, preferably 0.9<y<1.15, particularly preferably 1<y<1.05, results.

The powder mixture is filled into press moulds, surrounding a contact wire made from niobium or tantalum, pressed to a green density of 2.3 to 3.7 g/cm³ and sintered to form anode structures.

According to this third embodiment of the invention, however, the sintering of the anode pressed bodies to form the anode body is carried out in a hydrogen-containing atmosphere, in such a way that oxygen exchange between the suboxide and metal particles also takes place via the gas phase (intermediate formation of water vapour molecules at the oxide surfaces and reduction of these molecules at the metal surfaces) of the agglomerates.

In this third embodiment of the invention, it is preferable for an atmosphere with a relatively low hydrogen partial pressure to be used during the sintering, in order to ensure that there is no hydrogen embrittlement of the metallic component, in particular of the niobium or tantalum wire. It is preferable for the sintering to be carried out under a gas pressure of from 10 to 50 mbar absolute. If appropriate, post-sintering can be carried out under high vacuum.

During the sintering with oxygen equalization ("reaction sintering"), the volume of the metallic starting agglomerates increases and the volume of the oxidic starting agglomerates decreases. If a starting oxide of the approximate formula $NbO_2$ is used, the total volume during oxygen equalization to form NbO remains approximately constant. Competing changes in length and volume during sintering therefore only occur in the near region and are absorbed by the near region shifts which are in any case caused by the sintering process.

According to this third embodiment of the invention, anode bodies are formed with a substantially homogenous oxide composition of formula $NbO_y$, with y as defined above.

According to a fourth embodiment of the invention, firstly, as in the second embodiment of the invention, agglomerates (tertiary particles) are produced, including both metallic primary particles and/or secondary particles and oxidic primary and/or secondary particles within a particles composite (tertiary agglomerate particle).

According to this fourth embodiment of the invention, a suboxide powder of composition $NbO_x$ where $1.3<x<2.1$, preferably $1.8<x<2.1$, particularly preferably $1.9<x<2$, is mixed with a quantity of a metal powder which is such that a mean composition of the mixture which corresponds to the formula $NbO_y$, where $0.7<y<1.3$, preferably $0.9<y<1.15$, particularly preferably $1<y<1.05$, results.

According to this fourth embodiment of the invention, the sintering of the pressed anode structures is carried out in the same way as in the third embodiment of the invention, i.e. in the presence of hydrogen, resulting in an anode structure having a substantially homogenous composition corresponding to the formula $NbO_y$ where $0.7<y<1.3$, preferably $0.9<y<1.15$, particularly preferably $1<y<1.05$.

All four embodiments of the invention exploit the increased sintering activity of the anode pressed bodies through reaction sintering. This allows a considerable reduction in the sintering temperature and/or the sintering time. Both the anode pressed bodies and the sintered anode structures have an increased compressive strength. The anchoring of the contact wire to the anode sintered body is also improved. The anodes have an increased wire detachment strength under tension.

Production of the suboxide powders that can be used in accordance with the invention does not present any particular difficulty for the person skilled in the art. It is preferable to use the standard metallurgical reaction and alloying process, according to which, as in the present case, a mean oxide content is produced by exposing a highly oxidized precursor and an unoxidized precursor, in a non-oxidizing, preferably reducing atmosphere, to a temperature at which oxygen concentration equalization takes place. Although processes other than this solid-state diffusion process are conceivable, they require control and monitoring functions which can scarcely be achieved in technical terms at acceptable levels of outlay. Therefore, according to the invention it is preferable to use a niobium pentoxide which is commercially available with a high purity and to mix it with high-purity niobium metal, both in powder form corresponding to the stoichiometry, and to treat the mixture for several hours at a temperature of 800 to 1600° C. under an argon atmosphere which preferably contains up to 10% by volume of hydrogen. It is preferable for both the pentoxide and the metal to have primary particle sizes which, after the oxygen equalization, corresponds to the desired primary particle size of less than or slightly greater than 1 μm (smallest) cross-sectional dimension.

The niobium metal required for oxygen exchange with niobium pentoxide is preferably produced by reducing high-purity niobium pentoxide to the metal. This can be effected aluminothermically by igniting an $Nb_2O_5$/Al mixture and washing out the aluminium oxide formed and then purifying the niobium metal ingot by means of electron beams. The niobium metal ingot obtained after reduction and electron beam melting can be embrittled using hydrogen in a known way and milled, producing plateletlike powders.

The preferred process for producing the niobium metal follows the disclosure of WO 00/67936 A1. According to this preferred 2-stage process, the high-purity niobium pentoxide powder is firstly reduced by means of hydrogen at 1000 to 1600° C., preferably at 1450° C., to form the niobium dioxide of approximate formula $NbO_2$, and then the latter is reduced using magnesium vapour at 750 to 1100° C. to form the metal. Magnesium oxide which is formed in the process is washed out by means of acids.

The preferred process for producing the niobium suboxide of formula $NbO_x$ where $1.3<x<2.1$, preferably $1.8<x<2.1$, particularly preferably $1.9<x<2$, is carried out in accordance with the first stage of the process disclosed in WO 00/67936 A1, i.e. by reducing the niobium pentoxide by means of hydrogen at 1000 to 1600° C.

EXAMPLES

Various powders are produced using the process described in WO 00/67936 A1 from a partially agglomerated, finely particulate niobium pentoxide which has been screened through a screen with a mesh width of 300 μm and which comprises spherical primary particles with a diameter of approximately 0.4 μm, for the following experiments:

Powder 0: The niobium pentoxide powder is reduced to $NbO_2$ at 1250° C. under flowing hydrogen.

Powder A: The niobium pentoxide powder is reduced to form $NbO_2$ at 1480° C. under flowing hydrogen, milled and rubbed through a screen with a mesh width of 300 μm.

Powder B: Powder 0 is reduced to the niobium metal by means of magnesium vapour at a temperature of 980° C., milled, agglomerated in vacuo at 1150° C., cooled, passivated by gradual admission of oxygen and rubbed through a screen with a mesh width of 300 μm.

Powder C: Powder A and powder B are mixed in a molar ratio of 1:1, gently milled, heated to 1400° C. under an atmosphere comprising 80% by volume of argon and 20% by volume of hydrogen and rubbed through a screen with a mesh width of 300 μm.

Powder D: Powder A and powder B are mixed in a molar ratio of 1:0.8, heated to 1400° C. under an atmosphere comprising 80% by volume of argon and 20% by volume of hydrogen, and then rubbed through a screen with a mesh width of 300 μm.

Powder E: Powder A and powder B are mixed in a molar ratio of 1:0.7, heated to 1400° C. under an atmosphere comprising 80% by volume of argon and 20% by volume of hydrogen and then rubbed through a screen with a mesh width of 300 μm.

Table 1 gives the properties (mean values) for the powders obtained.

Mixtures were produced from the powders A, B, C, D and E, and these mixtures were used to produce anodes. The conditions are given in Table 2:

TABLE 1

|  |  | Powder A NbO$_{1.97}$ | Powder B Nb | Powder C NbO$_{0.98}$ | Powder D NbO$_{1.21}$ | Powder E NbO$_{1.32}$ |
|---|---|---|---|---|---|---|
| Primary particle size[1] | μm | 0.87 | 0.75 | 0.96 | 1.1 | 1.1 |
| Agglomerate size[2] | D10, μm | 43 | 37 | 58 | 67 | 56 |
|  | D50, μm | 128 | 117 | 145 | 151 | 164 |
|  | D90, μm | 254 | 248 | 272 | 281 | 293 |
| BET surface area[3] | m$^2$/g | 1.6 | 1.05 | 1.1 | 1.1 | 1.1 |
| Flow properties[4] | s | 30 | 28 | 59 | 60 | 58 |

[1] determined visually from REM images.
[2] laser diffraction (Malvern Mastersizer), ASTM B 822, wetting agent Daxad 11
[3] ASTM D 3663
[4] in accordance with Hall, ASTM B 213, duration of flow for 25 g of powder First of all "powder preforms" were produced from the powders by introducing them into suitable press tools, into which a contact wire made from tantalum had been placed, and pressing to a green density of 2.8 g/cm$^3$, and these powder preforms, standing freely in a furnace, were sintered at the temperature indicated either under a pressure of 10$^{-5}$ bar (vacuum) or at standard pressure in the atmosphere indicated.

To determine the compressive strength of the pressed and sintered bodies, cylindrical pressed bodies with a green density of 2.8 g/cm$^3$ were produced with dimensions 3.6 mm diameter and 3.6 mm length with a weight of 106 mg without fitted contact wire and sintered where appropriate.

TABLE 2

| Example No | Mixing ratio of the powders (parts by weight) A:B:C:D:E | Pretreatment of the powders prior to production of the pressed bodies | Sintering conditions |
|---|---|---|---|
| 1 (Comp.) | 0:0:100:0:0 | ./. | Vacuum, 1450° C. |
| 2 | 0:10:90:0:0 | Mixing | Vacuum, 1350° C. |
| 3 | 0:20:80:0:0 | Mixing | Vacuum, 1300° C. |
| 4 | 0:30:70:0:0 | Mixing | Vacuum, 1270° C. |
| 5 | 0:40:60:0:0 | Mixing | Vacuum, 1240° C. |
| 6 | 0:20:80:0:0 | Mixing, agglomeration[5], 1250° C., argon; Milling, agglomeration, screening[6] | Vacuum, 1350° C. |
| 7 | 0:30:70:0:0 | Mixing, agglomeration, 1250° C., argon, milling, agglomeration, screening | Vacuum, 1270° C. |
| 8 | 57:43:0:0:0 | Mixing | 90 Ar + 10 H$_2$ 1300° C. |
| 9 | 57:43:0:0:0 | Mixing | 90 Ar + 10 H$_2$ 1250° C. |
| 10 | 57:43:0:0:0 | Mixing | 90 Ar + 10 H$_2$ 1200° C. |
| 11 | 57:43:0:0:0 | Mixing, agglomeration, 1150° C., argon, milling, screening | 90 Ar + 10 H$_2$ 1260° C. |
| 12 | 57:43:0:0:0 | Mixing, agglomeration, 1150° C., argon, milling, agglomeration, screening | 90 Ar + 10 H$_2$ 1260° C. |
| 13 | 0:20:0:80:0 | Mixing | 95 Ar + 5 H$_2$, 1270° C. |
| 14 | 0:30:0:0:70 | Mixing | 95 Ar + 5 H$_2$, 1245° C. |

[5] "Agglomeration" means that the powders were heated at the temperature indicated in the atmosphere indicated to form sintered bridges over a period of 20 minutes.
[6] Rubbing through a screen with a mesh width of 300 μm.

TABLE 3

| | Powder properties after pretreatment | | Anode/capacitor properties | | |
|---|---|---|---|---|---|
| Ex. No. | Flow properties s | Compressive strength of the powder preform[7] kg | Compressive strength of the sintered body[8] kg | Wire detachment strength under tension[9] kg | spec. capacitance μFV/g |
| 1 (Comp.) | 59 | 0.5 | 5.2 | 1.5 | 77,131 |
| 2 | 49 | 1.5 | 10.8 | 2.4 | 75,837 |
| 3 | 41 | 2.1 | 13.7 | 2.8 | 77,792 |
| 4 | 35 | 2.5 | 15.1 | 3.1 | 76,232 |
| 5 | 30 | 2.8 | 16.4 | 3.3 | 74,566 |
| 6 | 40 | 2.3 | 15.1 | 3.0 | 77,924 |
| 7 | 37 | 2.7 | 16.9 | 2.9 | 78,411 |
| 8 | 37 | 2.5 | 17.3 | 3.0 | 68,442 |
| 9 | 37 | 2.5 | 17.3 | 3.0 | 73,978 |
| 10 | 37 | 2.5 | 17.3 | 3.0 | 78,112 |
| 11 | 41 | 2.4 | 18.9 | 2.7 | 75,336 |
| 12 | 40 | 2.8 | 19.1 | 2.9 | 73,592 |
| 13 | 42 | 2.0 | 12.9 | 2.6 | 78,618 |
| 14 | 37 | 2.3 | 14.7 | 2.8 | 79,915 |

[7] the pressed body without contact wire was clamped between the jaws of a compressive-force measurement apparatus and the jaws were pressed together until the pressed body disintegrated.
[8] as under [7], but measured after sintering.
[9] the anode body was clamped at the periphery in a threaded clamp, the contact wire was connected to a tension device and tensile load was applied until the wire became detached under tension.

Cylindrical anode bodies with a tantalum wire inserted axially in the centre, with a diameter of 3.6 mm and a length of 3.6 mm and an initial weight of powder of 103 mg, were produced in order to determine the capacitor properties and the wire detachment strength under tension.

The anode structures were then formed in 0.1% by weight strength phosphoric acid up to a forming voltage of 30 V at a current intensity limited to 150 mA/g, with the voltage being maintained for over 2 h after the current intensity had dropped to 0. To measure the specific capacitance, the cathode used was an 18% by weight strength sulphuric acid solution, and the measurement was carried out at a bias voltage of 10 V and an AC voltage with a frequency of 120 Hz.

Although the examples given above cannot yet be considered to have been optimized with regard to the process parameters selected, the advantages are clearly apparent and are very promising, even if the specific residual currents in some cases (with a high statistical scatter) reached 2 nA/μFV and were on average approximately 1 nA/μFV. Initial tests reveal the likelihood that the positive effects will be even greater with more finely particulate powders, i.e. powders which are suitable for capacitors with a higher capacitance, e.g. of over 120,000 μFV/g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing capacitor anodes comprising niobium suboxide, said process comprising the following steps in the following order:

(a) first mixing niobium suboxide particles of the formula $NbO_x$ wherein $0.7 < x < 2.1$, with at least one valve metal powder to form a niobium suboxide particles mixture wherein said niobium suboxide particles mixture consists essentially of niobium suboxide particles and valve metal powder(s) and said valve metal being a pressing and sintering aid.

(a) pressing niobium suboxide particles mixture to form powder preforms; and (b) sintering the powder preforms to form porous anode bodies.

2. The process of claim 1 wherein the valve metal is niobium metal powder.

3. The process of claim 1 wherein the valve metal and the niobium suboxide particles are mixed in a weight ratio from 0.1 to 2.

4. The process of claim 1 wherein the valve metal and the niobium suboxide particles are mixed and agglomerated together prior to being sintered.

5. The process as claimed in claim 1, wherein said niobium suboxide particles mixture consists of niobium suboxide particles and valve metal powder(s).

6. The process of claim 1 wherein the niobium suboxide is represented by the following formula, $NbO_x$ wherein $0.7 < x < 1.3$.

7. The process as claimed in claim 1, wherein x is greater than 0.7 and less than 1.05.

8. The process as claimed in claim 1, wherein x is greater than 1.0 and less than 1.05.

9. The process of claim 1 wherein the niobium suboxide is represented by the following formula, $$NbO_x$$

wherein $1.3<x<2.1$, and the sintering step is carried out in the presence of hydrogen.

10. The process of claim 9 wherein the mixture of niobium suboxide and said valve metal has a mean composition represented by the following formula $$NbO_y$$

wherein $0.7<y<1.3$.

* * * * *